United States Patent
Hotson et al.

(10) Patent No.: US 11,436,842 B2
(45) Date of Patent: Sep. 6, 2022

(54) BULB MASK REPRESENTATION FOR TRAFFIC LIGHT CLASSIFICATION

(71) Applicant: Argo AI, LLC, Pittsburgh, PA (US)

(72) Inventors: Guy Hotson, Mountain View, CA (US); Richard L. Kwant, San Bruno, CA (US); Ersin Yumer, Burlingame, CA (US)

(73) Assignee: Argo AI, LLC, Pittsburgh, PA (US)

( * ) Notice: Subject to any disclaimer, the term of this patent is extended or adjusted under 35 U.S.C. 154(b) by 38 days.

(21) Appl. No.: 16/817,704

(22) Filed: Mar. 13, 2020

(65) Prior Publication Data
US 2021/0287023 A1    Sep. 16, 2021

(51) Int. Cl.
| | |
|---|---|
| *G06V 20/58* | (2022.01) |
| *G05D 1/00* | (2006.01) |
| *G06T 7/90* | (2017.01) |
| *G06V 10/56* | (2022.01) |
| *G06V 10/60* | (2022.01) |

(52) U.S. Cl.
CPC .......... *G06V 20/584* (2022.01); *G05D 1/0088* (2013.01); *G06T 7/90* (2017.01); *G06V 10/56* (2022.01); *G06V 10/60* (2022.01); *G06T 2207/20084* (2013.01); *G06T 2207/30252* (2013.01)

(58) Field of Classification Search
CPC ............. G06K 9/2027; G06K 9/00791; G06K 9/00825; G06T 7/90; G06T 2207/20084; G06T 2207/30252; G06V 10/56; G06V 10/60; G05D 1/0088
See application file for complete search history.

(56) References Cited

U.S. PATENT DOCUMENTS

| | | |
|---|---|---|
| 8,170,340 B2 | 5/2012 | Klefenz |
| 9,014,905 B1 | 4/2015 | Kretzschmar et al. |
| 10,136,026 B2 | 11/2018 | Kanai |
| 10,325,166 B2 | 6/2019 | Kwant et al. |
| 10,325,373 B2 | 6/2019 | Kwant et al. |
| 10,339,669 B2 | 7/2019 | Kwant et al. |
| 11,068,729 B2 * | 7/2021 | Strigel ................. G06T 7/11 |

(Continued)

FOREIGN PATENT DOCUMENTS

| | | |
|---|---|---|
| CN | 106909937 A | 6/2017 |
| CN | 108304813 A | 7/2018 |

(Continued)

*Primary Examiner* — Jeremiah C Hallenbeck-Huber
(74) *Attorney, Agent, or Firm* — Fox Rothschild LLP

(57) ABSTRACT

Systems and methods are provided for representing a traffic signal device. The method includes receiving a digital image of a traffic signal device that includes one or more traffic signal elements, representing the traffic signal device as a raster image, each traffic signal element of the traffic signal device being represented by a mask corresponding to a location of the traffic signal element on the traffic signal device, representing each mask in a channel in the raster image, providing the raster image as an input to a neural network to classify a state for each of the one or more traffic signal elements, and receiving, from the neural network, a classified raster image, in which the classified raster image includes a plurality of masks, each mask representing a state of one of the one or more traffic signal elements.

20 Claims, 9 Drawing Sheets

(56) References Cited

U.S. PATENT DOCUMENTS

| | | |
|---|---|---|
| 2007/0150196 A1 | 6/2007 | Grimm |
| 2009/0174573 A1 | 7/2009 | Smith |
| 2016/0252905 A1 | 9/2016 | Tian et al. |
| 2019/0258876 A1* | 8/2019 | Liu .................... G06K 9/00805 |
| 2019/0266418 A1 | 8/2019 | Xu et al. |
| 2019/0332875 A1* | 10/2019 | Vallespi-Gonzalez ....................... G06F 16/29 |
| 2020/0012870 A1* | 1/2020 | Caron ....................... G06T 7/73 |
| 2020/0135030 A1* | 4/2020 | Krivokon ............. G08G 1/0145 |
| 2020/0160699 A1* | 5/2020 | Annapureddy ........ G06K 9/628 |
| 2020/0410263 A1* | 12/2020 | Gao ..................... G01S 17/931 |
| 2021/0097852 A1* | 4/2021 | Yoo ................... H04N 5/23241 |

FOREIGN PATENT DOCUMENTS

| | | |
|---|---|---|
| WO | 2018201835 A1 | 11/2018 |
| WO | 2018223882 A1 | 12/2018 |
| WO | 20190246250 A1 | 12/2019 |

* cited by examiner

BULB MASK REPRESENTATION FOR TRAFFIC LIGHT CLASSIFICATION

BACKGROUND

The present disclosure relates to traffic signal identification and, in particular, to using bulb mask representation to identify traffic signal devices and the states of various elements of traffic signal devices.

Traffic signal devices are critical to safe driving. They signal when it is the safe, legal, and appropriate time for vehicles to pass or enter certain intersections or other regions. For this reason, autonomous vehicles require the ability to accurately detect the various signal elements of the traffic signal devices and the states of each of those signal elements. Once determined, this information is used to accurately instruct the autonomous vehicles on how to react to a traffic signal device.

Various techniques are available for identifying traffic signal devices. One such technique is the use of one or more deep learning methods. Deep learning techniques and methods have the advantage of being largely data-driven and able to integrate information from a wide range of example images into a single classifier. While many architectures of deep learning models follow a common pattern of successive layers that reduce the dimensionality of an input image, the methods by which these models represent their inputs and outputs vary substantially.

Given that the detection of the state of a traffic light is ultimately a classification problem, once a traffic light is detected it is known that the light's state may be determined by using representations typically used for image classification, in which each possible state is encoded by one position in a one-hot vector. For example, a classifier that classifies images as containing a dog or a cat might represent its output as [probability_of_cat, probability_of_dog]. Analogously, a traffic light classifier might represent its outputs as [probability_red, probability_yellow, probability_green].

This approach works for most traffic lights, but becomes more complicated in light of traffic light faces that might have multiple bulb types of the same color (for example, traffic light faces with both arrows and circles, or multiple types of arrows on the same face). These types of traffic signal devices are common and, therefore, the ability to identify the various elements on these traffic signal devices and the states of each of these various elements is paramount.

In these scenarios, the output vector would need to be expanded to include every type and color combination, yet this still does not fully solve the problem due to the oftentimes complex nature of the faces of traffic signal devices. For example, some traffic light faces may have multiple bulbs of the same type and color that are differentiated only by their positions on the face of the traffic signal device. One example of this is the HAWK beacon, in which there are two red circle bulbs at the top of the face that flash in an alternating pattern.

Therefore, for at least these reasons, a better method of identifying and classifying various forms and states of traffic signal devices is needed.

SUMMARY

According to an aspect of the present disclosure, a method for representing a traffic signal device is provided. The method includes receiving, by a computer vision system of a vehicle, a digital image of a traffic signal device that includes one or more traffic signal elements. The method further includes, by a processor, representing the traffic signal device as a raster image, each traffic signal element of the traffic signal device being represented by a mask corresponding to a location of the traffic signal element on the traffic signal device, representing each mask in a channel in the raster image, in which the channel representing each mask corresponds to one or more features of each of the one or more traffic signal elements, providing the raster image as an input to a neural network to classify a state for each of the one or more traffic signal elements, and receiving, from the neural network, a classified raster image, in which the classified raster image includes a plurality of masks, each mask representing a state of one of the one or more traffic signal elements.

According to various embodiments, representing the traffic signal device as a raster image includes using map data to directly generate the raster image.

According to various embodiments, representing the traffic signal device as a raster image includes generating a digital image from map data.

According to various embodiments, each channel is an image color channel.

According to various embodiments, each image color channel corresponds to a unique color.

According to various embodiments, each traffic signal element of the traffic signal device corresponds to a designated light fixture configured to transmit traffic instructions to one or more drivers.

According to various embodiments, the one or more features of each of the one or more traffic signal elements includes one or more of the following: a green light; a yellow light; a red light; a circular light; a left arrow light; a right arrow light; a forward arrow light; a light having an arrow in any direction; a flashing green light, a flashing yellow light; a flashing red light; a U-turn light; a bicycle light; and an X-light.

According to various embodiments, each mask corresponds to a discrete region of pixels in the raster image.

According to various embodiments, each discrete region of pixels is rectangular in shape. The discrete region of pixels may be any suitable shape.

According to various embodiments, the method further includes identifying a face of the traffic signal device, each traffic signal element being located within the face of the traffic signal device.

According to various embodiments, the method further includes generating a confidence value that a traffic signal element of a traffic signal device correlates to a state, and if the confidence value is greater than a threshold value, determining that the traffic signal element is a state.

According to various embodiments, the method further includes using a position and shape of each mask in the raster image to identify an angle of the traffic signal device. For enumerable fields, the information may be encoded using the color channel in the mask, as well as a binary value (0 for false, 1 for true, for example). For continuous fields, the information may be encoded in a particular color channel, where the value of the mask indicates the value of the continuous field. For example, the red channel may have values between 0 and 200 meters.

According to another aspect of the present disclosure, a system for representing a traffic signal device is provided. The system includes a vehicle, a computer vision system of the vehicle, configured to receive a digital image of a traffic signal device that includes one or more traffic signal elements, and a transceiver configured to send and receive digital information. The system further includes a processor configured to represent the traffic signal device as a raster image in which each traffic signal element of the traffic signal device is represented by a mask corresponding to a location of the traffic signal element on the traffic signal device, to represent each mask in a channel in the raster image, in which the channel representing each mask corresponds to one or more features of each of the traffic signal elements, provide, using the transceiver, the raster image as an input to a neural network to classify a state for each traffic signal element, and receive, from the neural network, using the transceiver, a classified raster image, in which the classified raster image includes a plurality of masks, each of which represents a state of one of the traffic signal elements.

According to various embodiments, the processor is further configured to represent the traffic signal device as a raster image using map data to directly generate the raster image.

According to various embodiments, the processor is further configured to represent the traffic signal device as a raster image by generating a digital raster image from map data.

According to various embodiments, each traffic signal element of the traffic signal device corresponds to a designated light fixture configured to transmit traffic instructions to one or more drivers.

According to various embodiments, the one or more features of the traffic signal elements includes one or more of the following: a green light; a yellow light; a red light; a circular light; a left arrow light; a right arrow light; a forward arrow light; a light having an arrow in any direction; a flashing green light, a flashing yellow light; a flashing red light; a U-turn light; a bicycle light; and an X-light.

According to various embodiments, each mask corresponds to a discrete region of pixels in the raster image.

According to various embodiments, the processor is further configured to identify a face of the traffic signal device, each traffic signal element being located within the face of the traffic signal device.

According to yet another aspect of the present disclosure, a system for representing a traffic signal device is provided. The system includes a vehicle including a computer vision system configured to receive a digital image of a traffic signal device that includes one or more traffic signal elements. The vehicle further includes a computer-readable storage medium comprising one or more programming instructions that, when executed, cause the vehicle to represent the traffic signal device as a raster image, wherein each traffic signal element of the traffic signal device is represented by a mask corresponding to a location of the traffic signal element on the traffic signal device, represent each mask in a channel in the raster image, in which the channel representing each mask corresponds to one or more features of each of the one or more traffic signal elements, provide the raster image as an input to a neural network to classify a state for each of the one or more traffic signal elements, and receive, from the neural network, a classified raster image, in which the classified raster image includes a plurality of masks, wherein each mask represents a state of one of the one or more traffic signal elements.

DETAILED DESCRIPTION

Figure 1:
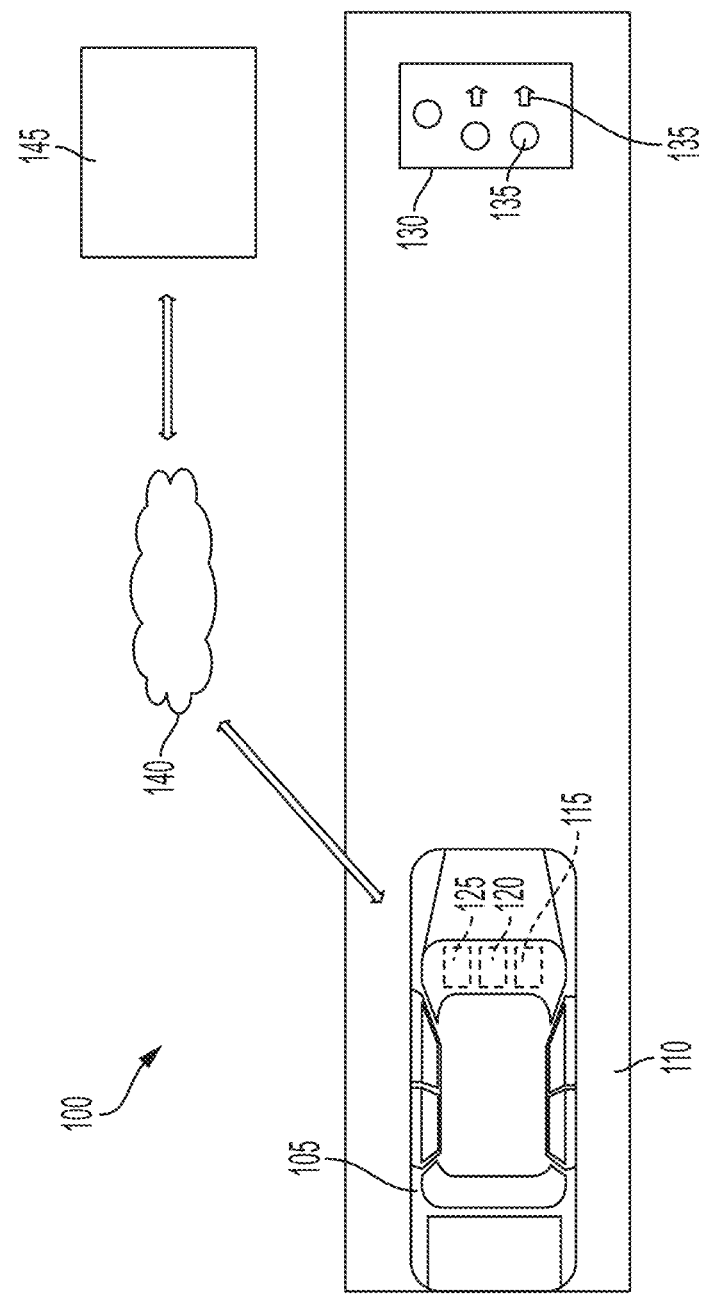
FIG. 1 is an example of a system for identifying and classifying traffic signal devices, in accordance with various embodiments of the present disclosure.

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

In this document: (i) the term "comprising" means "including, but not limited to"; the singular forms "a," "an," and "the" include plural references unless the context clearly dictates otherwise; and (iii) unless defined otherwise, all technical and scientific terms used in this document have the same meanings as commonly understood by one of ordinary skill in the art. Also, terms such as "top" and "bottom", "above" and "below", and other terms describing position are intended to have their relative meanings rather than their absolute meanings with respect to ground. For example, one structure may be "above" a second structure if the two structures are side by side and the first structure appears to cover the second structure from the point of view of a viewer (i.e., the viewer could be closer to the first structure).

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, kiosks, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which processing devices and/or memory are shared. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, "electronic communication" refers to the transmission of data via one or more signals between two or more electronic devices, whether through a wired or wireless network, and whether directly or indirectly via one or more intermediary devices. Devices are "communicatively connected" if the devices are able to send and/or receive data via electronic communication.

Referring now to FIG. 1, a system 100 for identifying and classifying traffic signal devices 130 is provided.

According to various embodiments, the system 100 includes a vehicle 105. According to various embodiments, the vehicle 105 is traveling on a road 110. It is noted, however, that any suitable path may be implemented.

The vehicle 105 may include a computer vision system 115 configured to receive a digital image of a traffic signal device 130. The computer vision system 115 may include one or more cameras for capturing digital images of various features of the environment in which the vehicle 105 is traveling. Such features may include one or more traffic signal devices 130. According to various embodiments, the digital image is a raster image, such as that shown in FIG. 3. The traffic signal device shown in FIG. 1 (with more detail shown in the image of FIG. 2), includes several traffic signal elements 135. The traffic signal elements 135 are dynamic in that they can be changed between at least two states to transmit traffic instructions to one or more drivers, and different types of signal elements 135 may be present in a single traffic signal device 130. Examples of traffic signal elements 135 may include, for example, a red light, a yellow light and a green light. Other examples include lights with directional arrows (such as arrows pointing left or right), other symbols (such as a symbol of a person walking), or words. In each of these examples, each light can be switched between an off state and an on state. Lights may be Light Emitting Diodes (LEDs), bulbs, and/or any other suitable lighting element that conveys the state of a traffic signal element 135. According to various embodiments, the light may be reflective in nature.

Figure 2:
FIG. 2 is an example of an image of a traffic signal device, in accordance with the present disclosure.

The signal elements 135 are represented in FIG. 2 for illustration purposes as circular lights and arrow lights. However, the features of each of the signal elements 135 may be any of various signal element features such as, for example, a green light, a yellow light, a red light, a circular light, a left arrow light, a right arrow light, a light having an arrow positioned in any direction, a forward arrow light, a flashing green light, a flashing yellow light, a flashing red light, a U-turn light, a bicycle light, an X-light, and/or any other suitable traffic signal element features. It is further noted that the traffic signal device 130 may include any suitable number of signal elements 135, having various positions on the face of the traffic signal device 130. The traffic signal elements 135 correspond to a designated light fixture configured to transmit traffic instructions to one or more drivers.

The vehicle 105 may further include a transceiver 120 configured to send and receive digital information from a remote server 145 via a wired and/or wireless connection such as, for example, through the cloud 140, wherein the vehicle 105 and the remote server 145 are in electronic communication with each other. The vehicle 105 may further include a processor 125. The processor 125 may be configured to represent the traffic signal device 130 as a raster image (such as that shown in FIG. 3) in which each traffic signal element 135 of the traffic signal device 130 is represented by a mask corresponding to a location of the traffic signal element 135 on the traffic signal device 130. It is noted that the processor 125 may be a standalone processor 125, the vehicle's 105 processor 125, and/or the remote server's 145 processor 125. Data processed by the processor 125 may be data received from the vehicle 105, received from the remote server 145, and/or a combination of data from the vehicle 105 and the remote server 145.

Figure 3:
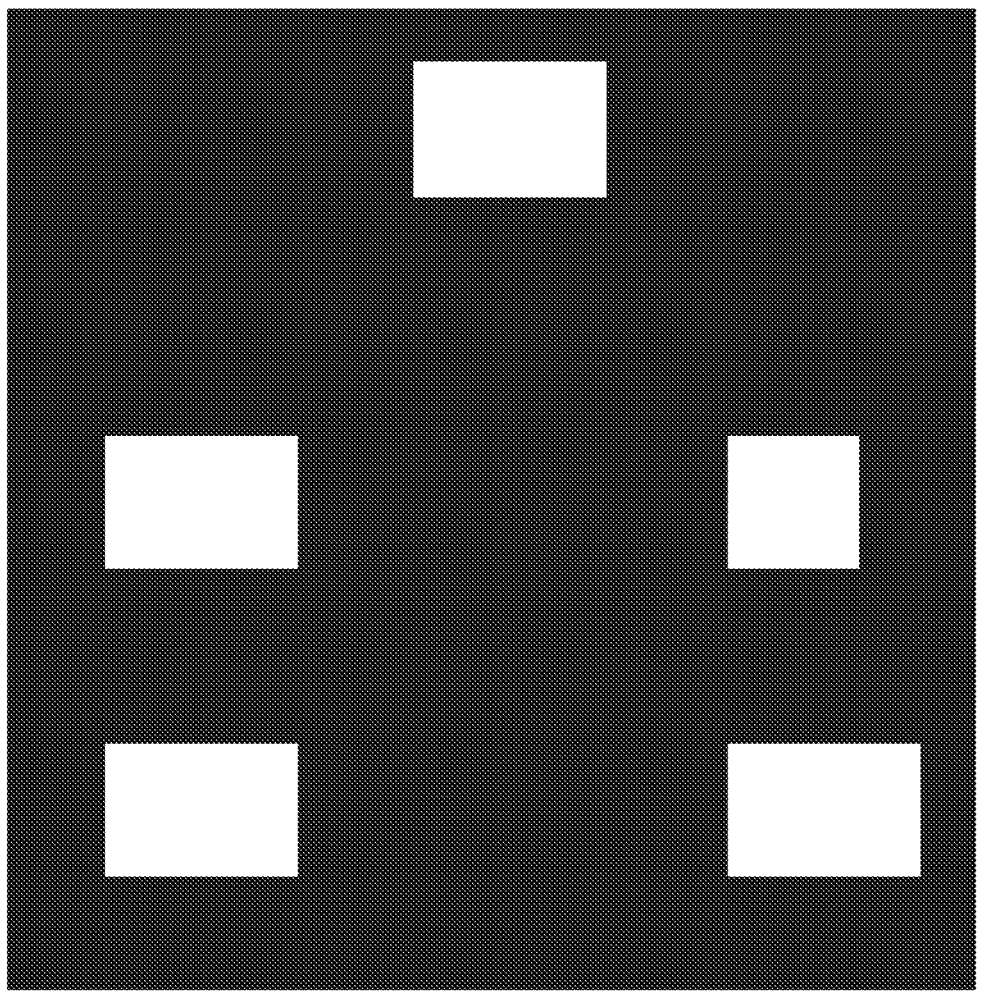
FIG. 3 is an example of a raster image of a traffic signal device representing the positions of traffic signal device elements on the face of the traffic signal device, in accordance with the present disclosure.

As shown in FIG. 3, the raster image forms a template to indicate the layout of a traffic signal device 130 face to the network 145. The image represents the face as a square image (although any rectangular shape may be used), where each signal element 135 is represented as a rectangle that corresponds to a rasterization of the signal element 135 at its corresponding location on the face of the traffic signal device 130. Each of the signal elements 135 is represented by a discrete region of pixels. Each discrete region of pixels may be rectangular in shape and/or any other suitable shape. The processor 125 may be configured to represent the traffic signal device 130 as a raster image using map data to directly generate the raster image and/or may generate a digital/raster image from map data.

In order for an autonomous vehicle 105 to ascertain the signal elements 135 of a traffic signal device 130, such as that shown in FIGS. 1-2 and/or any other relevant traffic signal device 130, the autonomous vehicle 105 much determine the signal elements 135 of the traffic signal device 130, the position of each of the signal elements 135 on the face of the traffic signal device 130, and the state of each of the signal elements 135 of the traffic signal device 130.

According to various embodiments, in order to classify the signal elements 135 of the traffic signal device 130, the traffic signal device 130 is represented as a simplified two-dimensional image with at least one or more image color channels, where the signal elements 135 of the traffic signal device 135 correspond to discrete regions of pixels within the two-dimensional image. According to various embodiments, each image color channel corresponds to a unique color. Therefore, in the two-dimensional image, the signal elements 135 that are separated in space on the face of the actual traffic signal device 130 are analogously separated in space on the two-dimensional image representation of the traffic light face. This spatial separation in the two-dimensional raster image signifies that the traffic light classifier system 100 is able to represent any number of signal elements 135 with any number of color and type combinations.

Figure 4:
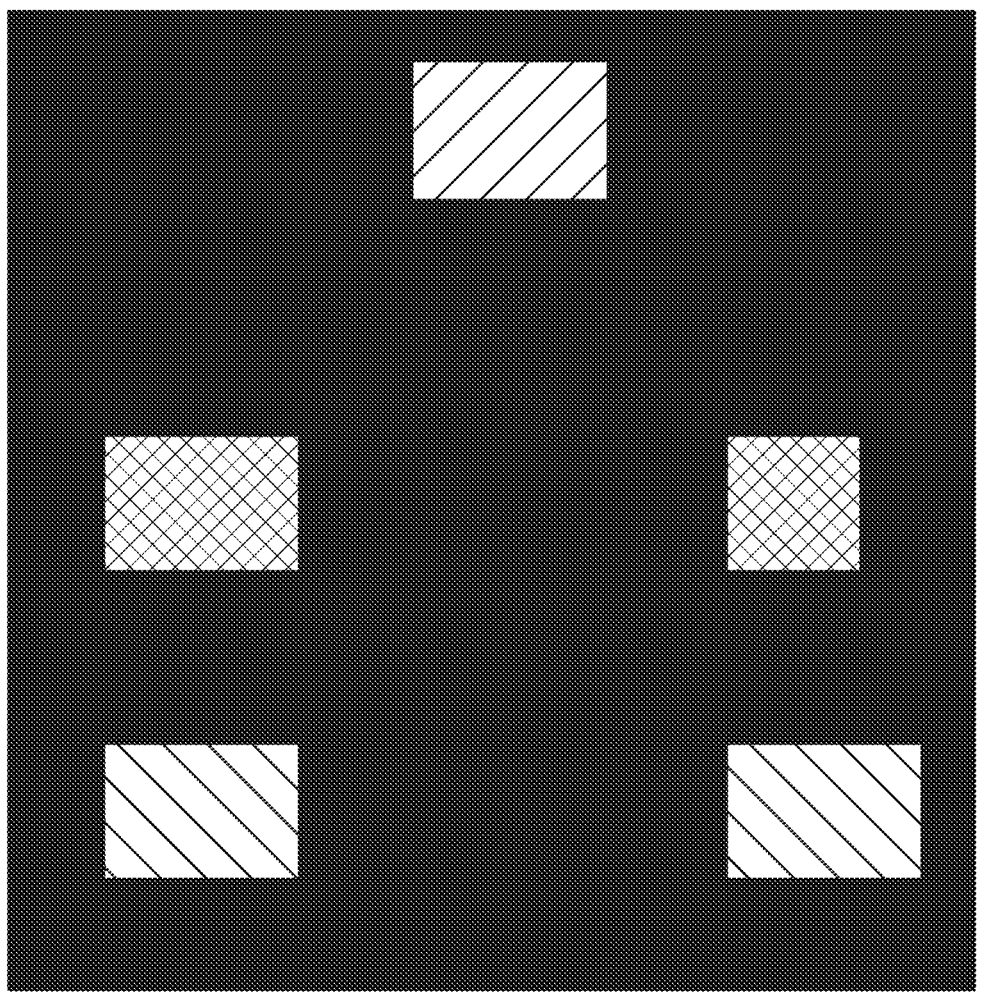
FIG. 4 is an example of a raster image of a traffic signal device representing the elements of the traffic signal device rasterized into one or more channels, in accordance with the present disclosure.
Figure 5:
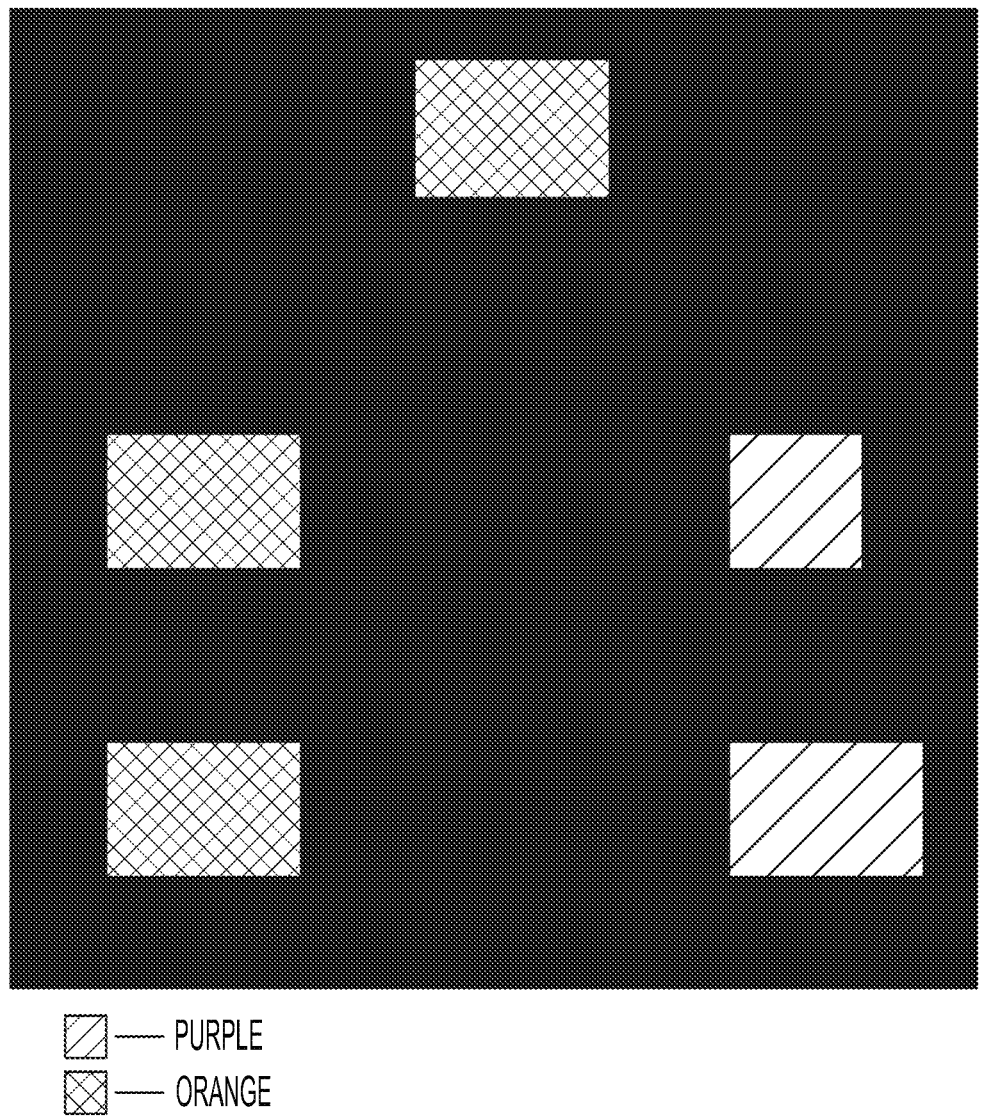
FIG. 5 is an example of a raster image of a traffic signal device representing the elements of the traffic signal device rasterized into one or more channels, in accordance with the present disclosure.

According to various embodiments, the processor 125 may further be configured to represent each mask in a channel in the raster image, in which the channel representing each mask corresponds to one or more features of each of the traffic signal elements 135. Such raster images are shown in FIGS. 4-5. The features may include the shape of the signal elements 135, the colors of the signal elements 135, whether any blinders are present, the angle of the face of the traffic signal device 130, and/or any other suitable features that aid in the classification of the signal elements 135 of the traffic signal device 130.

In addition to the spatial location, the raster image can indicate the colors and types of each signal element 135. It does so by representing different colors and types of signal element 135 as different channels. For example, green, yellow, and red lights may correlate to channels 0, 1 and 2, and circular lights, straight arrow lights, right arrow lights, and left arrow lights may correspond to channels 3, 4, 5, and 6. It is noted, however, that the features of the signal elements 135 and the colors, shapes, and channels used may be of any suitable type and number. According to various embodiments, one or more scalar values such as, for example, the angle of the face of the traffic signal device 130, may be represented as one or more scalar values in a particular channel.

As shown in FIG. 4, a rasterized image of the face of a traffic signal device 130 is illustratively depicted, wherein the image color channels indicate whether the signal elements 135 on the face of the traffic signal device 130 are green, yellow, or red. The colors may be rasterized in any suitable image color channel. For example, in the rasterized image shown in FIG. 4, the green light signal elements 135 are rasterized in channel 0 (the red channel), the yellow light signal elements 135 are rasterized in channel 1 (the green channel), and the red light signal elements 135 are rasterized in channel 2 (the blue channel).

As shown in FIG. 5, a rasterized image of the face of a traffic signal device 130 is illustratively depicted, wherein the image color channels indicate a type or shape of a light or bulb for each of the signal elements 135 on the face of the traffic signal device 130. As shown in FIG. 5, the circular signal elements 135 are rasterized in channel 3 (the orange channel), and the right arrows are rasterized in channel 5 (the purple channel).

According to various embodiments, the processor 125, using the transceiver 120, is further configured to provide one or more raster images (for example, those shown in FIGS. 3-5) and an image of the actual traffic signal device 130 (for example, that shown in FIG. 2) inputs to a neural network to classify a state for each signal element 135 of the traffic signal device 130. According to various embodiments, the neural network analyzes the raster images and the image of the traffic signal device 130 and produces a classified raster image, such as the classified raster image shown in FIG. 6. Once generated, the classified raster image is received, using the transceiver 115.

Figure 6:
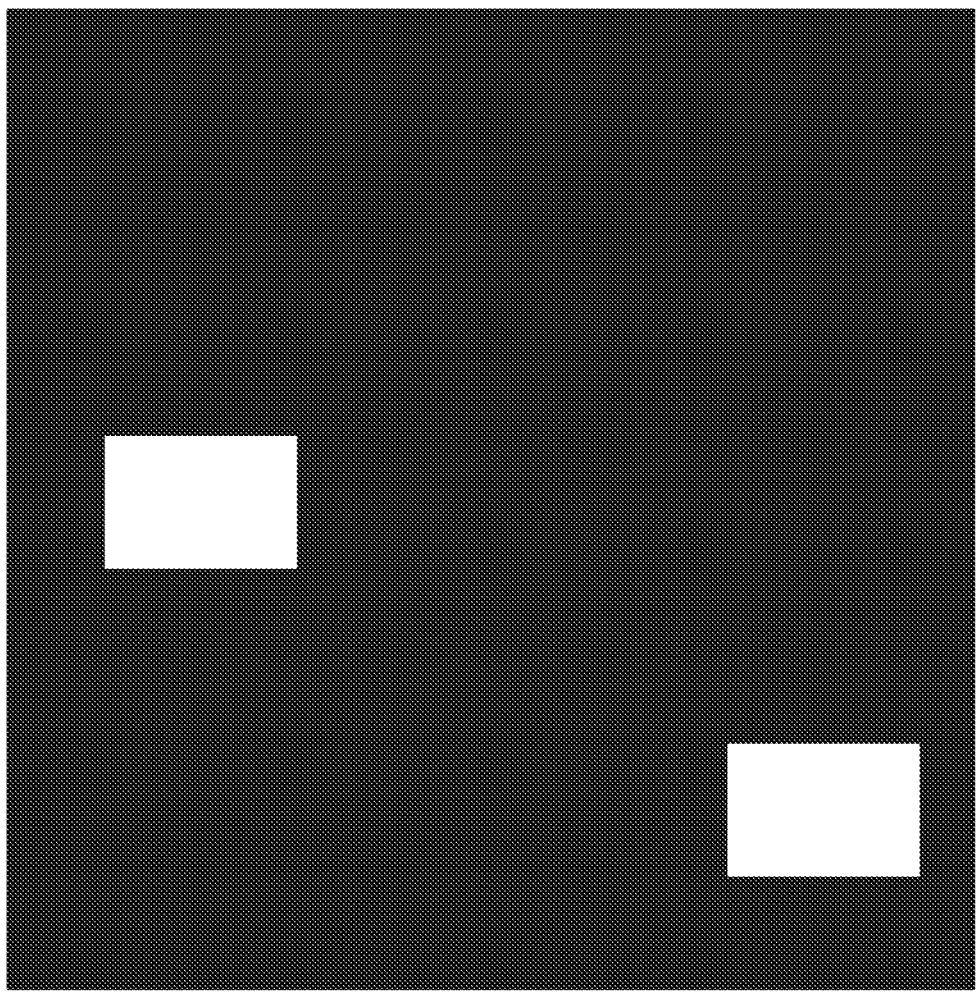
FIG. 6 is an example of a classified raster image of a traffic signal device, in accordance with the present disclosure.

In FIG. 6, a classified raster image is illustratively depicted. According to various embodiments, the neural network receives the raster images and the image of the face of the traffic signal device 130 and fills out a state image based upon the template image (for example, the template image shown in FIG. 3). The template image may aid in darkness (for example, at night, in the shade, etc.) in determining the state of the signal elements 135 of the traffic signal device 130.

The state image indicates which signal elements 135 are lit. It performs this by, for example, filling in regions corresponding to the lit signal elements 135 with ones and the other regions of the face of the traffic signal device 130 with zeros. It is noted, however, that other means of determining which signal elements 135 are lit may additionally, or alternatively, be used. According to various embodiments, the groupings of ones may indicate a confidence that a signal element 135 is lit. According to various embodiments, the values may be intermediate floating point values (for example, 0.5) if there is uncertainty concerning which bulbs are lit. The state image is used to generate the classified raster image, such as that shown in FIG. 6, wherein the lit signal elements 135 are indicated by the white rectangular blocks. According to some embodiments, the state image and the raster image are the same image. The classified raster image may include one or more masks, each of which may represent a state of one or more of the signal elements 135 of the traffic signal device 130. Each mask corresponds to a discrete region of pixels in the raster image. The angle of the traffic signal device 130 may, for example, be determined based on the values contained within each mask on the raster image. Other suitable means of determining the angle may additionally, or alternatively, be used.

Figure 7:
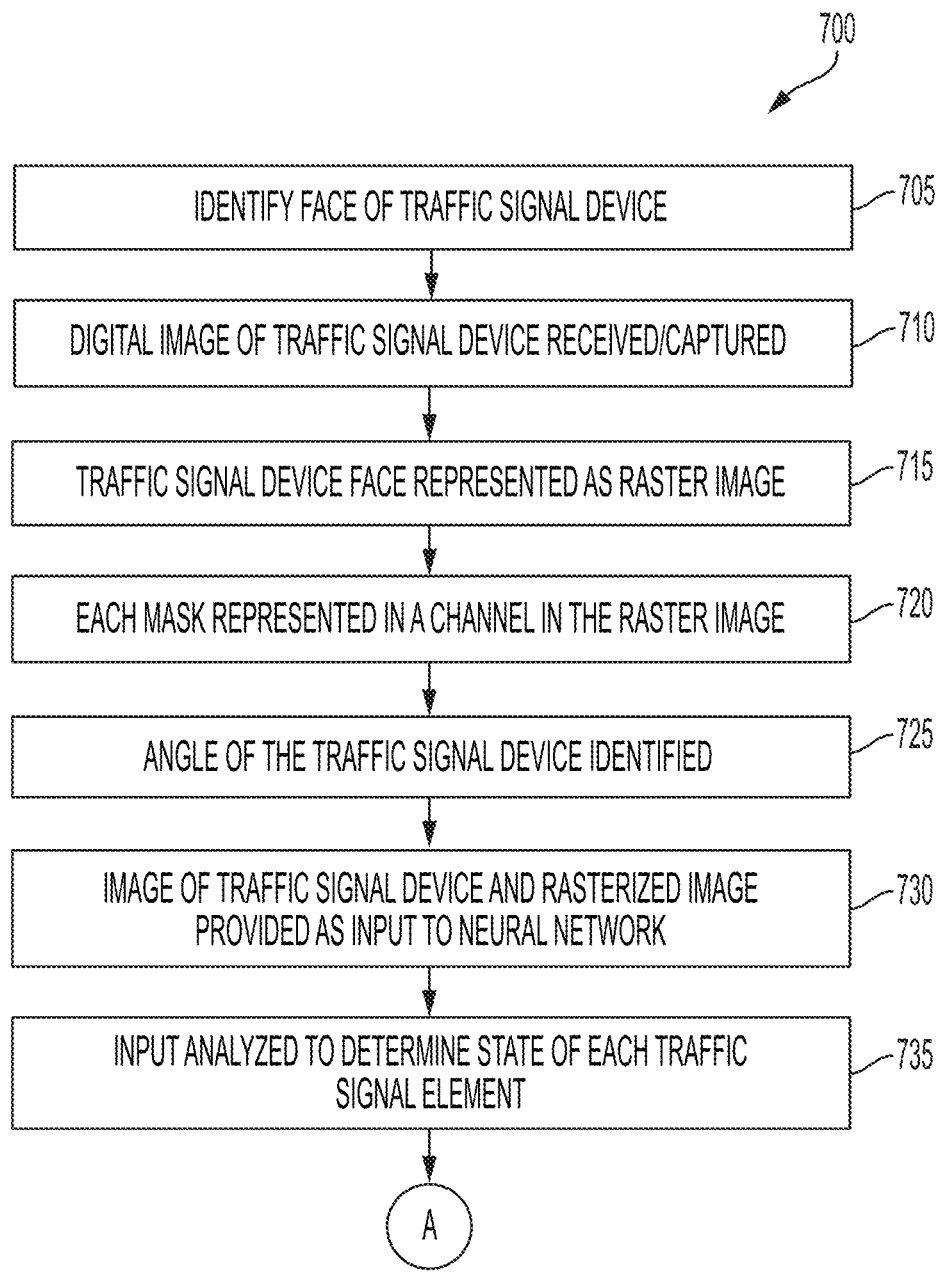
FIGS. 7-8 show a flowchart of an example of a method for identifying and classifying a traffic signal device, in accordance with various embodiments of the present disclosure.
Figure 8:
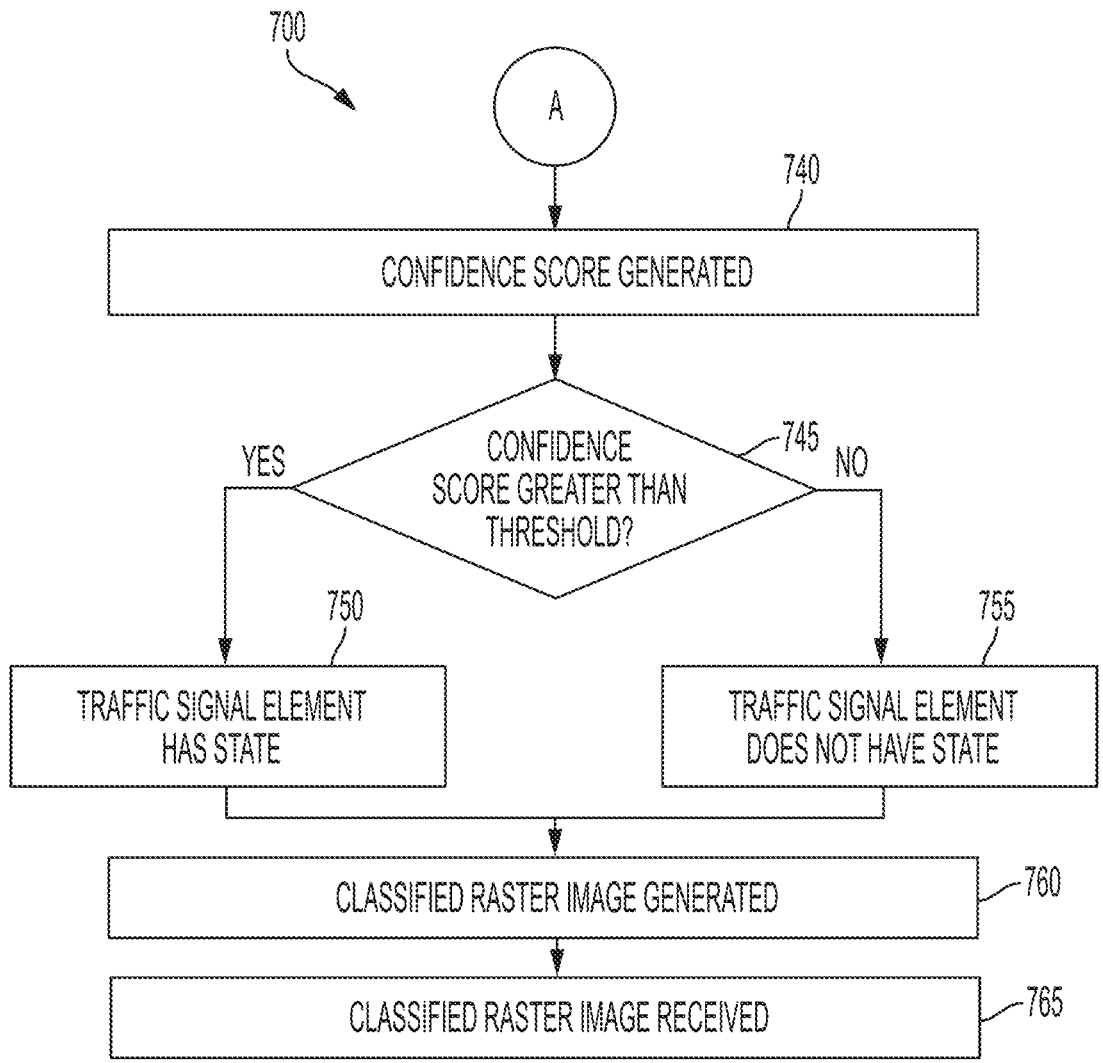

Referring now to FIGS. 7-8, a method 700 for identifying and classifying a traffic signal device is illustratively depicted.

While driving, a vehicle may come across a traffic signal device. At 705, using a processor, a face of the traffic signal device is identified. It is noted that the processor may perform one or more of the steps described herein in method 700. At 710, a digital image of a traffic signal device is received/captured by a computer vision system of a vehicle. According to various embodiments, the digital image is a real world image. According to various embodiments, the "real world image" is a digitally captured photograph of a view from the perspective of the vehicle. The computer vision system may include, for example, a camera. The traffic signal device includes one or more traffic signal elements on the face of the traffic signal device, wherein each traffic signal element of the traffic signal device corresponds to a designated light fixture configured to transmit traffic instructions to one or more drivers.

At 715, the face of the traffic signal device is represented as a raster image, wherein each traffic signal element of the traffic signal device is represented by a mask corresponding to a location of the traffic signal element on the traffic signal device, forming a template image. Once the template image is formed, each mask, at 720, is represented in a channel in the raster image, in which the channel representing each mask corresponds to one or more features of each of the one or more traffic signal elements. Optionally, the angle of the traffic signal device represented in the mask image may, at 725, be identified based on a position and shape of each mask on one or more of the raster images.

Using the captured image of the traffic signal device, at 730, the image of the traffic signal device and the rasterized images are provided as an input to a neural network to classify a state for each of the one or more traffic signal elements and generate a classified raster image. The neural network, at 735, analyzes the input to determine a state of each of the traffic signal elements and, at 740, generates a confidence score indicating a confidence that a particular traffic signal element has a specified state. According to various embodiments, a confidence score is placed into the classified raster image. At 745, it is determined whether the confidence score is above a threshold. If the confidence score is equal to or above the threshold, the traffic signal element, at 750, is determined to have a specified state. If the confidence score is below the threshold, the traffic signal element, at 755, is determined to not have the specified state.

After identifying the state of each of the traffic signal elements, the classified raster image, at 760, is generated. The classified raster image includes a one or more masks, wherein each mask represents a state of one or more one or more traffic signal elements. Once generated, the processor, at 765, receives the classified raster image.

Figure 9:
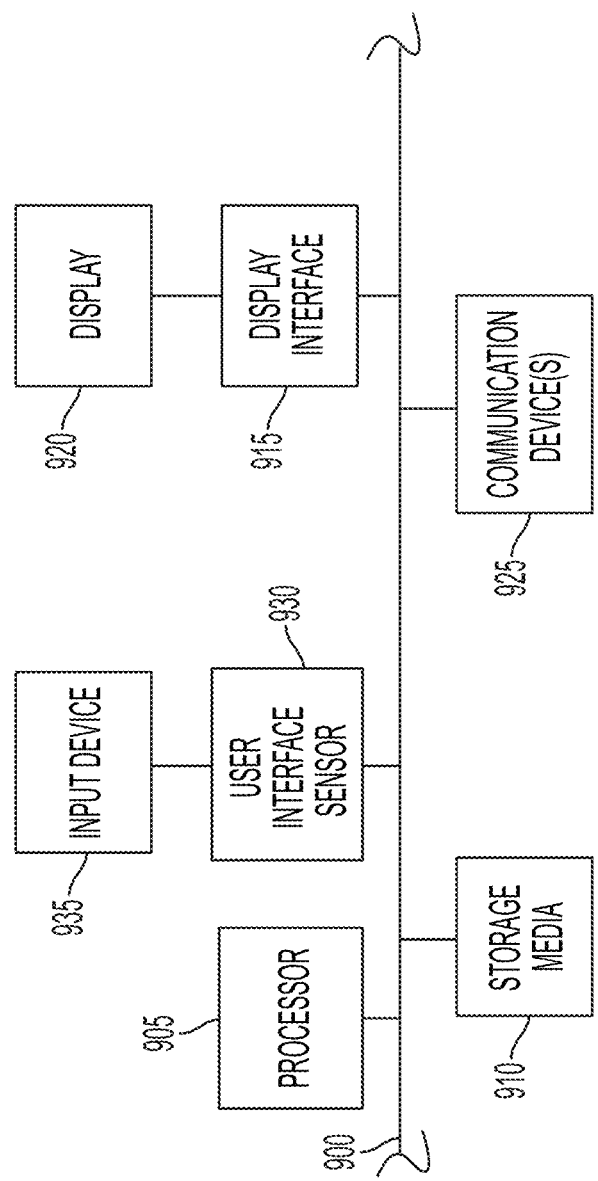
FIG. 9 illustrates a block diagram of example hardware that may be used to contain or implement program instructions according to various embodiments of the present disclosure.

FIG. 9 depicts an example of internal hardware that may be included in any of the electronic components of an electronic device as described in this disclosure such as, for example, an on-premises electronic device, an associate electronic device, a remote electronic device and/or any other integrated system and/or hardware that may be used to contain or implement program instructions. The vehicle described in this disclosure may be an electronic device, including some or all of the components described herein.

A bus 900 serves as the main information highway interconnecting the other illustrated components of the hardware. CPU 905 is the central processing unit of the system, performing calculations and logic operations required to execute a program. CPU 905, alone or in conjunction with one or more of the other elements disclosed in FIG. 9, is an example of a processor as such term is used within this disclosure. Read only memory (ROM) and random access memory (RAM) constitute examples of non-transitory computer-readable storage media 910, memory devices or data stores as such terms are used within this disclosure.

Program instructions, software or interactive modules for providing the interface and performing any querying or analysis associated with one or more data sets may be stored in the computer-readable storage media 910. Optionally, the program instructions may be stored on a tangible, non-transitory computer-readable medium such as a compact disk, a digital disk, flash memory, a memory card, a USB drive, an optical disc storage medium and/or other recording medium.

An optional display interface 915 may permit information from the bus 900 to be displayed on the display 920 in audio, visual, graphic or alphanumeric format. Communication with external devices may occur using various communication ports 925. A communication port 925 may be attached to a communications network, such as the Internet or an intranet. In various embodiments, communication with external devices may occur via one or more short range communication protocols.

The hardware may also include an interface 930, such as graphical user interface, which allows for receipt of data from input devices such as a keyboard or other input device 935 such as a mouse, a joystick, a touch screen, a remote control, a pointing device, a video input device and/or an audio input device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for representing a traffic signal device, the method comprising:

by a computer vision system of a vehicle, receiving a digital image of a traffic signal device that includes one or more traffic signal elements; and by a processor:
  representing the traffic signal device as a raster image, wherein:
    each traffic signal element of the traffic signal device is represented by a mask corresponding to a location of the traffic signal element on the traffic signal device,
    each mask is represented in only one of a plurality of channels in the raster image, and
    each channel in the raster image is a color channel that indicates a color, feature or both of the traffic signal element represented in the mask;
  providing the raster image as an input to a neural network to classify a state of each of the one or more traffic signal elements; and
  receiving, from the neural network, a classified raster image, in which the classified raster image includes a plurality of masks, wherein each mask represents the state of one of the one or more traffic signal elements.

2. The method of claim 1, wherein representing the traffic signal device as a raster image comprises using map data to directly generate the raster image.

3. The method of claim 1, wherein representing the traffic signal device as a raster image comprises:
  generating a digital image from map data; and
  converting the digital image to a raster image.

4. The method of claim 1, wherein the plurality of color channels in the raster image correspond to a plurality of different colors.

5. The method of claim 1, wherein each traffic signal element of the traffic signal device corresponds to a designated light fixture configured to transmit traffic instructions to one or more drivers.

6. The method of claim 1, wherein the color, feature, or both of each of the one or more traffic signal elements represented in the color channels comprise one or more of the following:
  a green light;
  a yellow light;
  a red light;
  a circular light;
  a left arrow light;
  a right arrow light;
  a forward arrow light;
  a light having an arrow in any direction;
  a flashing green light;
  a flashing yellow light;
  a flashing red light;
  a U-turn light;
  a bicycle light; or
  an X-light.

7. The method of claim 1, wherein each mask corresponds to a discrete region of pixels in the raster image.

8. The method of claim 7, wherein each discrete region of pixels is rectangular in shape.

9. The method of claim 1, further comprising:
  identifying a face of the traffic signal device, wherein each traffic signal element is located within the face of the traffic signal device.

10. The method of claim 1, further comprising:
  generating a confidence value that a traffic signal element of a traffic signal device correlates to the state; and if the confidence value is greater than a threshold value, determining that the traffic signal element is in the state.

11. The method of claim 1, further comprising using a position and shape of each mask in the raster image to identify an angle of the traffic signal device.

12. A system for representing a traffic signal device, the system comprising:
- a computer vision system configured to receive a digital image of a traffic signal device that includes one or more traffic signal elements;
- a transceiver configured to send and receive digital information; and
- a processor and program instructions configured to instruct the processor to:
  - represent the traffic signal device as a raster image in which:
    - each traffic signal element of the traffic signal device is represented by a mask corresponding to a location of the traffic signal element on the traffic signal device,
    - each mask is represented in only one of a plurality of channels in the raster image, and
    - each channel in the raster image is a color channel that indicates a color, feature or both of the traffic signal element represented in the mask;
  - provide, using the transceiver, the raster image as an input to a neural network to classify a state of each traffic signal element; and
  - receive, from the neural network, using the transceiver, a classified raster image, in which the classified raster image includes a plurality of masks, each of which represents the state of one of the traffic signal elements.

13. The system of claim 12, wherein the program instructions to represent the traffic signal device as a raster image comprise instructions to use map data to directly generate the raster image.

14. The system of claim 12, wherein the program instructions to represent the traffic signal device as a raster image comprise instructions to generate a digital image from map data and convert the digital image to a raster image.

15. The system of claim 12, wherein the plurality of color channels in the raster image correspond to a plurality of different colors.

16. The system of claim 12, wherein the color, feature, or both of each of the one or more traffic signal elements represented in the color channels comprise one or more of the following:
- a green light;
- a yellow light;
- a red light;
- a circular light;
- a left arrow light;
- a right arrow light;
- a forward arrow light;
- a light having an arrow in any direction;
- a flashing green light;
- a flashing yellow light;
- a flashing red light;
- a U-turn light;
- a bicycle light; or
- an X-light.

17. The system of claim 12, wherein each mask corresponds to a discrete region of pixels in the raster image.

18. The system of claim 12, wherein the processor is further configured to:
- identify a face of the traffic signal device,
- wherein each traffic signal element is located within the face of the traffic signal device.

19. A system for representing a traffic signal device, the system comprising:
- a processor;
- a computer vision system configured to receive a digital image of a traffic signal device that includes one or more traffic signal elements; and
- a non-transitory computer-readable storage medium comprising one or more programming instructions that, when executed, cause the processor to:
  - represent the traffic signal device as a raster image, wherein:
    - each traffic signal element of the traffic signal device is represented by a mask corresponding to a location of the traffic signal element on the traffic signal device,
    - each mask is represented in only one of a plurality of in a channels in the raster image, and
    - each channel in the raster image is a color channel that indicates a color, feature or both of the traffic signal element represented in the mask;
  - provide the raster image as an input to a neural network to classify a state of each of the one or more traffic signal elements; and
  - receive, from the neural network, a classified raster image, in which the classified raster image includes a plurality of masks, wherein each mask represents the state of one of the one or more traffic signal elements.

20. The system of claim 19, wherein the color, feature, or both of each of the one or more traffic signal elements represented in the color channels comprise one or more of the following:
- a green light;
- a yellow light;
- a red light;
- a circular light;
- a left arrow light;
- a right arrow light;
- a forward arrow light;
- a light having an arrow in any direction;
- a flashing green light;
- a flashing yellow light;
- a flashing red light;
- a U-turn light;
- a bicycle light; or
- an X-light.

* * * * *